United States Patent [19]

Naka et al.

[11] 4,100,114

[45] Jul. 11, 1978

[54] POLYURETHANE FOAM COMPOSITION

[75] Inventors: Reishi Naka; Toshikazu Narahara; Junji Mukai, all of Hitachi, Japan

[73] Assignee: Hitachi, Ltd., Japan

[21] Appl. No.: 645,340

[22] Filed: Dec. 30, 1975

[30] Foreign Application Priority Data

Jan. 6, 1975 [JP] Japan .................................. 50-45

[51] Int. Cl.$^2$ ...................... C08G 18/06; C08K 3/34; C08L 75/04
[52] U.S. Cl. ................................ 521/175; 260/37 N; 521/111; 521/122
[58] Field of Search ........................ 260/2.5 AK, 37 N

[56] References Cited

U.S. PATENT DOCUMENTS

| 3,046,172 | 7/1962 | Reid | 260/2.5 AK |
|---|---|---|---|
| 3,238,156 | 3/1966 | Kohrn | 260/2.5 AK |
| 3,290,165 | 12/1966 | Iannicelli | 106/308 |
| 3,524,794 | 8/1970 | Jonnes et al. | 260/2.5 AK |
| 3,585,157 | 6/1971 | Beck | 260/2.5 AK |
| 3,627,706 | 12/1971 | Chant | 260/2.5 AK |
| 3,959,197 | 5/1976 | Salyer et a. | 260/2.5 AK |

OTHER PUBLICATIONS

Einhorn–J. Cellular Plastics, Jan. 1965, pp. 25–31.
Kogyo Zairyo–21, No. 8, pp. 28–29 (Aug. 1973).
"Skalite," brochure from Aso Cement Co., Ltd.
Dow Corning Technical Bulletin No. 03–028 "Silane Coupling Agents" (1967), p. 24.

Primary Examiner—Donald E. Czaja
Assistant Examiner—H. H. Fletcher
Attorney, Agent, or Firm—Craig & Antonelli

[57] ABSTRACT

A rigid polyurethane foam composition characterized by containing 5 to 20% by weight of hollow-spherical Silas balloons having a particle size of 100 to 300 μ (based on the total weight of the polyol and isocyanate components of the polyurethane foam) and 0.2 to 2% by weight of an organosilane compound (based on the total weight of the polyol and isocyanate components of the polyurethane foam and said Silas balloons) in the rigid polyurethane foam.

7 Claims, No Drawings

POLYURETHANE FOAM COMPOSITION

The present invention relates to a rigid polyurethane composition. More particularly, the invention pertains to a rigid polyurethane composition in which the amount of the resin components, that is, the polyol and isocyanate components used has been curtailed without impairing the physical properties of the polyurethane foam.

Rigid polyurethane foam is widely used as a heat insulating agent for keeping warmth or cold such as a heat insulating agent for a refrigerator or as various sound insulating agents.

In recent years, the shortage of starting materials for synthetic resins has become a serious problem and a movement for accomplishing the curtailment of base materials for resins by adding various inorganic fillers to plastics to extend them has become active. There are examples wherein powder of inorganic fillers such as calcium carbonate or glass short fiber has been added to several synthetic resins such as polypropylene.

This is the case with rigid polyurethane foam which is most often used as a synthetic resin material for insulating heat or sound. The addition of inorganic powdery fillers such as calcium carbonate has been attempted. In polyurethane foam, however, the addition of ordinary inorganic fillers such as calcium carbonate causes remarkable deterioration in physical properties, particular increase in friability and deterioration in dimensional stability.

An object of the present invention is to curtail starting materials for polyurethane foam by using inorganic fillers as an extender.

Another object of the invention is to provide a polyurethane foam composition having substantially similar physical properties to those of polyurethane foam containing no inorganic filler.

Another object of the invention is to provide a polyurethane foam which can be expanded at a high expansion ratio and which has excellent properties and a density of about 0.05 g/cm$^3$ or less.

According to the present invention, there is provided a rigid polyurethane foam composition characterized by containing 5 to 20% by weight of hollow-spherical Silas balloons (hereinafter referred to as "Silas balloons") having a particle size of 100 to 300 μ (based on the total weight of the polyol and isocyanate components of the polyurethane foam) and 0.2 to 2% by weight of an organosilane compound (based on the total weight of the polyol and isocyanate components of the polyurethane foam and said Silas balloons) in the rigid polyurethane foam.

The raw material for the Silas balloons used in the present invention is an amorphous natural glass produced in Southern Kyushu district and Towada district in Japan. This natural glass is subjected to sudden cooling and reduction in pressure. The resulting product contains about 60 to 70% by weight of amorphous natural glass. The Silas balloons used in the present invention are obtained by foaming this amorphous natural glass containing product. Foaming is carried out by the action of the moisture contained in this raw material as a blowing agent. As the moisture, there are the moisture bonded to the glass structure in the foam of OH ion and the moisture present in microbores in the form of $H_2O$. When particles of the raw material are molten and softened by heating, the above-mentioned moisture is simultaneously vaporized and expanded. Since the melt has a viscosity enough to accept the water vapor, Silas balloons are formed. The specific gravity of the particles is within a range of about 0.1 to 0.5, and preferably of 0.2 to 0.4.

Various processes for the production of the Silas balloons are known. The production of the Silas balloons will be explained below specifically. Particles of the raw material are baked at the temperature of about 1000° C for time as short as 1 minute or less. Extreme instantaneous baking gives a baked product of outside open type. On the other hand, if preheating time is prolonged, the internal blowing component diffuses out of the particles and the yield of the Silas balloons is reduced. Therefore, it is desirable to select the optimum heating pattern according to the place of production, kind and particle size of the raw material as well as the properties required for the product. In general, an electric furnace is suitably used in baking. Also, the Silas balloons are commercially available by Aso Cement Co., Ltd. in Japan under the trademark of "Skalite."

The Silas balloons used in the present invention must have a particle size of 100 to 300μ. If the particle size is less than 100μ or more than 300μ, the friability of the polyurethane foam is remarkably increased. However, 30% by weight (based on the total weight of the Silas balloons) of the Silas balloons having a particle size of less than 100μ or more than 300μ may be contained. Even in such a case, the effects of the present invention are not impaired at all.

The most effective amount of the Silas balloons blended is 5 to 20% by weight based on the total weight of the polyol and isocyanate components of the polyurethane foam. This lower limit of 5% by weight has been decided as the minimum value having a substantial significance as an extender. The upper limit of 20% by weight has been decided from the viewpoint of friability. If the amount of the Silas balloons blended exceeds 20% by weight, the polyurethane foam becomes unpractical owing to its remarkably increased friability.

As the organosilane compounds used in the present invention, all known organosilane compounds may be used. Specifically, aminosilanes such as n-(trimethoxysilylpropyl)ethylenediamine, n-(dimethoxymethylsilylpropyl)ethylenediamine, N-(β-aminoethyl)-(γ-aminopropyl)methyldimethoxysilane or N-(β-aminoethyl)-(γ-aminopropyl)trimethoxysilane and epoxysilanes such as β-(3,4-epoxycyclohexyl)ethyltrimethoxysilane, γ-(glycidoxypropyl)trimethoxysilane or γ-glycidoxy-3,3-dimethyl-1-propenyltrimethoxysilane may be used, and at least one of these organosilane compounds may be used. Among them, aminosilanes, and particularly aminosilanes obtained from primary and secondary amines are advantageous in that they show a catalytic action for the reaction between the polyol and isocyanate components of the polyurethane foam and thereby the friability of the foam is reduced. The amount of the organosilane compounds used in the present invention may be within a range of 0.2 to 2% by weight (based on the total weight of the polyol and isocyanate components of the polyurethane foam and the Silas balloons). If the organosilane compounds are added to and mixed with the starting materials for the foam, however, it is desirable from the viewpoint of friability to use the compounds in an amount of 1 to 2% by weight. Also, if the surface of the Silas balloons is previously treated, it is advantageous to decide the amount of the organosilane compounds used on the basis of the amount of said Silas balloons used. In this case, the objects of the present invention can be accomplished enough by using 1 to 5% by weight of the organosilane compounds based on the weight of said Silas balloons. The surface treatment of the Silas balloons with the organosilane compounds can be accomplished by coating the surface of the Silas balloons with a solution of an organosilane compound in a known organic solvent, and preferably a polar solvent, and then drying the resulting coating.

The means for incorporating the Silas balloons and the organosilane compounds into the polyurethane foam is not critical so long as they can be eventually contained in the foam. Also, the timepoint of incorporating them can be freely selected.

The term "polyurethane foam" used herein means polyurethane foams as produced by well known one-shot method or prepolymer method, and thereby means all of the rigid and flexible polyurethane foams produced from a polyol or polyether and an isocyanate.

If necessary, a foaming agent, a catalyst or the other additives may be added to the composition of the present invention. As the foaming agent, for example, $CO_2$ (as generated by the use of water), $CCl_3F$ (Freon R-11), $CCl_2F_2$ (Freon R-12) and $CCl_2F$-$CClF_2$ (Freon R-113) may be used alone or in admixture of two or more thereof.

As the catalyst, many compounds have been provided for the production of polyurethane foam, and tertiary amines and organometallic compounds are commercially useful. In general, the tertiary amines are often used. Among the tertiary amines, those containing an aromatic ring bonded to a nitrogen atom are inactive and act as a negative catalyst. As tertiary amines, for example, trialkylamines such as triethylamine, trialkylenediamines such as triethylenediamine, morpholine derivatives such as N-methylmorpholine, and piperazine derivatives such as N,N'-diethyl-2-methylpiperazine are enumerated. The organometallic compounds are exemplified by dibutyl tin laurate, dibutyl tin di(2-ethylhexoate), dibutyl tin acetate, stannous 2-ethylcaproate and stannous oleate. Also, as the other additives, a foam stabilizer, a crosslinking agent or the like may be used. As the foam stabilizer, an emulsifier or a surface active agent is generally used. Usually, polysiloxane-polyoxyalkyleneglycol block copolymers are most often used. Anionic surface active agents, for example, fatty acid amides such as diethylaminooleate and sulfonates such as sodium dioctylsulfosuccinate and sodium dodecanesulfonate are also useful. Further, nonionic surface active agents such as sorbitan fatty acid esters such as sorbitan monosterate, polyhydric alcohol fatty acid esters such as glycerol monooleate, and reaction products of an alkoxylated vegetable oil such as ethoxylated castor oil with an alkylene oxide such as ethylene oxide are useful.

The present invention is further illustrated by the following examples referring to the following comparative and referential examples. However, the present invention is not limited to the examples, but, for example, the starting materials for a foam, the conditions for the production of the foam, the particle size and amount of Silas balloons and the kind of the organosilane compound used can be freely changed.

COMPARATIVE EXAMPLES 1 - 4

In the production of polyurethane foam according to so-called usual one-shot method which comprises using 100 parts by weight of a sucrose polyether (number of functional groups 8, OH number 480 - 490) as a polyol component, 98.2 parts by weight of tolylene diisocyanate (NCO content 39 - 40%) as an isocyanate component, 2 parts by weight of dimethylaminoethanol and 0.2 part by weight of dibutyl tin acetate as catalysts, 2 parts by weight of a polysiloxane-polyoxyalkylene copolymer (melting point 15° C, specific gravity 1.070 at 25° C, viscosity 335 centipoises at 25° C) as a foam stabilizer, and 35.8 parts by weight of trichlorofluoromethane ($CCl_3F$, Freon R-11) as a foaming agent and mixing uniformly and stirring these components, the various fillers as shown in Table 1 were added to the starting materials for the foam and polyurethane foam compositions were produced using a free rise box (200 × 200 × 200 mm).

EXAMPLE A

A polyurethane foam composition was produced in the same manner as in the previous comparative examples except that the Silas balloons having a particle size of 230μ as shown in Table 1 were used as a filler.

The friability and density of the polyurethane foam compositions as produced in Comparative Examples 1 - 4 and Example A are shown in Table 1. Also, for comparison, an example of adding no filler is shown in Table 1.

Table 1

| Sample | Kind | Particle size (μ) | * % by weight | ** Friability (%) | Density (g/cm³) |
|---|---|---|---|---|---|
| Comparative Example 1 | Calcium carbonate | 3-8 | 5 | 55 | 0.032 |
|  |  |  | 15 | 85 | 0.045 |
| Example 2 | Diatomaceous earth | 10-20 | 5 | 62 | 0.028 |
| Example 3 | Magnesium oxide | 3-8 | 15 | 100 | 0.029 |
|  |  |  | 5 | 48 | 0.029 |
| Example 4 | Glass beads | 100-200 | 15 | 68 | 0.031 |
|  |  |  | 5 | 25 | 0.040 |
| Example A | Silas balloons | 230 | 15 | 40 | 0.048 |
|  |  |  | 5 | 20 | 0.028 |
|  | No filler added |  |  | 30 | 0.032 |
|  |  |  |  | 14 | 0.027 |

* The amount of a filler blended is based on the total weight of the polyol and isocyanate components of the polyurethane foam.
** According to ASTM-C 421-61.

Table 1 shows that the Silas balloons are most effective as a filler.

REFERENTIAL EXAMPLES 1 - 3 AND EXAMPLES 1 - 4

Polyurethane foam compositions were produced in the same manner as in Comparative Example 1 except that 15% by weight of Silas balloons having the respective particle sizes as shown in Table 2 on the basis of the total weight of the polyol and isocyanate components of the polyurethane foam were used as a filler.

Table 2

| Sample | Particle size of Silas balloons (μ) | Friability (%) | Density (g/cm³) |
|---|---|---|---|
| Referential Example 1 | 30 | 45 | 0.028 |
| Example 1 | 60 | 32 | 0.029 |
| Example 2 | 100 | 28 | 0.030 |
| Example 3 | 150 | 26 | 0.030 |
| Example 4 | 230 | 25 | 0.030 |
| Referential Example 2 | 300 | 27 | 0.032 |
| Referential Example 3 | 370 | 35 | 0.035 |

Table 2 shows that the Silas balloons give very low friability at a particle size of 100 to 300μ and particularly give the lowest value at a particle size of 200 to 250μ.

A relationship between the amount of the Silas balloons blended and the properties of the foam is illustrated by the following referential examples and examples.

REFERENTIAL EXAMPLES 4 – 7 AND EXAMPLES 5 – 8

Polyurethane foam compositions were produced in the same manner as in Comparative Example 1 except that Silas balloons having a particle size of 230μ were used as a filler in the respective amounts as shown in Table 3.

Table 3

| Sample | Amount of Silas balloons blended* (% by weight) | Friability (%) | Density (g/cm³) |
|---|---|---|---|
| Referential Example 4 | 1 | 16 | 0.027 |
| Example 5 | 3 | 18 | 0.027 |
| Example 5 | 5 | 20 | 0.029 |
| Example 6 | 10 | 23 | 0.030 |
| Example 7 | 15 | 25 | 0.030 |
| Example 8 | 20 | 28 | 0.033 |
| Referential Example 6 | 25 | 35 | 0.035 |
| Example 7 | 30 | 42 | 0.037 |

* Based on the total weight of the polyol and isocyanate components of the polyurethane foam.

Table 3 shows that the amount of the Silas balloons blended of 5 to 20% by weight on the basis of the total weight of the polyol and isocyanate components of the polyurethane foam is preferable.

The effect of the addition of an organosilane compound is illustrated by the following Examples 9 – 20.

EXAMPLES 9 – 20

Polyurethane foam compositions were produced in the same manner as in Comparative Example 1 except that 10% by weight (based on the total weight of the polyol and isocyanate components of the polyurethane foam) of Silas balloons having a particle size of 230μ as a filler and the organosilane compounds as shown in Table 4 were used. The organosilane compounds as well as the Silas balloons were previously added to and mixed with the polyol component. The properties of the foams are shown in Table 4.

Table 4

| Ex. | Organosilane compound Kind | % by weight* | Friability (%) | Density (g/cm³) |
|---|---|---|---|---|
| 9 | n-(Trimethoxysilylpropyl)-ethylenediamine | 0.1 | 23 | 0.030 |
| 10 | n-(Dimethoxymethylsilylpropyl)ethylene diamine | 0.2 | 16 | 0.029 |
| 11 | n-(Trimethoxysilylpropyl)-ethylenediamine | 1.0 | 16 | 0.029 |
| 12 | n-(Dimethoxymethylsilylpropyl)ethylene-diamine | 1.5 | 15 | 0.029 |
| 13 | n-(Trimethoxysilylpropyl)-ethylenediamine | 2.0 | 15 | 0.029 |
| 14 | n-(Dimethoxymethylsilylpropyl)ethylene-diamine | 2.5 | 15 | 0.029 |
| 15 | β-(3,4-Epoxycyclohexyl)ethyltrimethoxysilane | 0.1 | 23 | 0.030 |
| 16 | γ-Glycidoxypropyltrimethoxysilane | 0.2 | 15 | 0.029 |
| 17 | β-(3,4-Epoxycyclohexyl)-ethyltrimethoxysilane | 1.0 | 15 | 0.029 |
| 18 | γ-Glycidoxypropyltrimethoxysilane | 1.5 | 14 | 0.029 |
| 19 | β-(3,4-Epoxycyclohexyl)ethyltrimethoxysilane | 2.0 | 14 | 0.029 |
| 20 | γ-Glycidoxypropyltrimethoxysilane | 2.5 | 14 | 0.029 |

* The amount of the organosilane compounds blended is based on the total weight of the polyol and isocyanate components of the polyurethane foam and the Silas balloons.

Table 4 shows that the effect of the addition of the organosilane compounds is large and that the largest effect is obtained by adding 0.2 to 2% by weight of the organosilane compounds. Further, it was confirmed by the above-mentioned examples and many other experiments of the present inventors that the properties of the foam did substantially not vary according to the kind of the organosilane compound blended.

EXAMPLES 21 – 28

Polyurethane foam compositions were produced in the same manner as in Comparative Example 1 except that 15% by weight of Silas balloons having a particle size of 230μ was used as a filler and the surface of the Silas balloons was previously treated with n-(dimethoxymethylsilylpropyl)ethylenediamine in the amounts as shown in Table 5. The surface treatment of the Silas balloons with the organosilane compound was carried out by dipping the Silas balloons in methanol, recovering and then drying.

Table 5

| Example | Amount of organosilane compound deposited* (% by weight) | Friability (%) | Density (g/cm³) |
|---|---|---|---|
| 21 | 0.3 | 23 | 0.030 |
| 22 | 0.5 | 20 | 0.030 |
| 23 | 1 | 18 | 0.029 |
| 24 | 2 | 18 | 0.029 |
| 25 | 3 | 17 | 0.029 |
| 26 | 4 | 16 | 0.029 |
| 27 | 5 | 16 | 0.029 |
| 28 | 6 | 16 | 0.029 |

* Based on the weight of the Silas balloons.

Table 5 shows that the amount of the organosilane compounds required in the previous treatment of the surface of the Silas balloons is less than half that in the addition to the starting materials for the foam.

EXAMPLES 29 – 34

Polyurethane foam compositions were produced in the same manner as in Example 13 except that the amount of Freon R-11 as a foaming agent used was increased to 36 to 54 parts by weight.

Table 6

| Example | Friability (%) | Dimensional stability (volume change) (−20° C/48 hour) (%) | Density (g/cm³) | Amount of Freon R-11 used (g) |
|---|---|---|---|---|
| 29 | 15 | −0.8 | 0.027 | 38 |
| 30 | 16 | −1.8 | 0.025 | 42 |
| 31 | 17 | −1.8 | 0.025 | 45 |
| 32 | 19 | −2.5 | 0.023 | 48 |
| 33 | 20 | −3 | 0.021 | 50 |
| 34 | 28 | −18 | 0.019 | 53 |
| No filler added | 14 | −1.3 | 0.027 | 35.8 |
| " | 24 | −17 | 0.023 | 48 |

As is clear from Table 6, dimensional stability is good and the effect of the addition of the Silas balloons is larger than in the case where no filler has been added, at a density of 0.021 g/cm³ or more when the amount of Freon R-11 (a foaming agent) used is increased.

It has heretofore been recognized that a low specific gravity itself can increase an expansion ratio. Therefore, saving of raw materials can be accomplished according to the present invention.

What is claimed is:

1. A rigid polyurethane foam-containing composition which also contains 5 to 20% by weight of hollow-spherical amorphous natural vitreous Silas balloons having a particle size of 100 to 300μ, based on the total weight of polyol and isocyanate components of the polyurethane foam, and 0.2 to 2% by weight of an organosilane compound, based on the total weight of the polyol and isocyanate components of the polyurethane foam and said Silas balloons in the rigid polyurethane foam, said foam composition having a density of about 0.05 gram per cubic centimeter or less.

2. A rigid polyurethane foam-containing composition according to claim 1 wherein the surfaces of the hollow-spherical Silas balloons have been treated with 1 to 5% by weight of the organosilane compound based on the weight of the hollow-spherical Silas balloons.

3. A rigid polyurethane foam containing composition according to claim 1 wherein the organosilane compound is an aminosilane compound.

4. A rigid polyurethane foam containing composition according to claim 2 wherein the organosilane compound is an aminosilane compound.

5. A rigid polyurethane foam containing composition according to claim 1 wherein the hollow-spherical Silas balloons have a particle size of 200 to 250μ.

6. A rigid polyurethane foam containing composition according to claim 2 wherein the hollow-spherical Silas balloons have a particle size of 200 to 250μ.

7. A rigid polyurethane foam-containing composition according to claim 1, wherein the Silas balloons have a specific gravity of from about 0.1 to 0.5.

* * * * *